United States Patent
Shin et al.

(10) Patent No.: US 12,353,730 B2
(45) Date of Patent: Jul. 8, 2025

(54) SSD PERFORMANCE PER POWER STATE IMPROVEMENT BY DETERMINISTIC UTILIZATION CONTROL

(71) Applicant: SK hynix Inc., Gyeonggi-do (KR)

(72) Inventors: Seong Won Shin, San Jose, CA (US); Kailash Mallikarjunaswamy, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 71 days.

(21) Appl. No.: 17/940,324

(22) Filed: Sep. 8, 2022

(65) Prior Publication Data
US 2024/0086086 A1    Mar. 14, 2024

(51) Int. Cl.
*G06F 12/00* (2006.01)
*G06F 3/06* (2006.01)

(52) U.S. Cl.
CPC .......... *G06F 3/0625* (2013.01); *G06F 3/0653* (2013.01); *G06F 3/0679* (2013.01)

(58) Field of Classification Search
CPC ..... G06F 3/0625; G06F 3/0653; G06F 3/0679
See application file for complete search history.

(56) References Cited

U.S. PATENT DOCUMENTS

| | | | |
|---|---|---|---|
| 9,760,311 B1* | 9/2017 | Amir | G06F 1/3275 |
| 11,169,583 B2* | 11/2021 | Karalnik | G06F 1/3287 |
| 11,243,807 B2 | 2/2022 | Bahramshahry et al. | |
| 2014/0281647 A1* | 9/2014 | Bodas | G06F 1/3206 |
| | | | 713/340 |
| 2016/0320995 A1* | 11/2016 | Warriner | G06F 1/206 |
| 2019/0272021 A1* | 9/2019 | Olarig | G06F 3/0688 |
| 2019/0310786 A1* | 10/2019 | Hodes | G06F 3/0679 |
| 2021/0109587 A1* | 4/2021 | Mukker | G06F 1/206 |
| 2021/0405731 A1* | 12/2021 | Navon | G06F 1/3275 |
| 2022/0124009 A1* | 4/2022 | Metsch | H04L 63/1433 |
| 2022/0236912 A1* | 7/2022 | Zeleniak | G06F 3/0653 |
| 2022/0253232 A1* | 8/2022 | Gyllenskog | G06F 3/0659 |
| 2022/0269425 A1* | 8/2022 | Sharma | G06F 3/0613 |
| 2022/0300049 A1* | 9/2022 | Dahiya | G06F 1/324 |
| 2022/0391090 A1* | 12/2022 | Muthiah | G06N 5/022 |
| 2023/0236652 A1* | 7/2023 | Moshe | G06F 1/3203 |
| | | | 713/320 |

* cited by examiner

*Primary Examiner* — Daniel D Tsui
(74) *Attorney, Agent, or Firm* — IP & T GROUP LLP

(57) ABSTRACT

A method for operating a system including a host and at least one solid state drive (SSD). The method identifies a workload associated with the SSD, recognizes a power state of the SSD, and controls allocation and/or deallocation of hardware resources for the identified workload per a budgeted target for the power state.

20 Claims, 7 Drawing Sheets

SSD PERFORMANCE PER POWER STATE IMPROVEMENT BY DETERMINISTIC UTILIZATION CONTROL

BACKGROUND

1. Field

Embodiments of the present disclosure relate to a scheme for controlling power utilization in a memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and solid state drives (SSDs). A memory system receives commands associated with a memory device from a host and process the commands on the memory device.

SUMMARY

Aspects of the present invention include a system and a method for operating a data storage system.

In one aspect, there is provided a method for operating a system including a host and at least one solid state drive (SSD), the method comprising: comprising: identifying a workload associated with the SSD, recognizing a power state of the SSD for an operational command received from the host, and controlling allocation and/or deallocation of hardware resources for the identified workload per a budgeted target for the recognized power state.

In another aspect, there is provided a system for operating a data processing system, comprising: a host; a memory storage; and a controller included in the memory storage, the controller configured to: identify a workload associated with the SSD; recognize a power state of the SSD for an operational command received from the host; and control allocation and/or deallocation of hardware resources for the identified workload per a budgeted target for the recognized power state.

Additional aspects of the present invention will become apparent from the following description.

DETAILED DESCRIPTION

Figure 1:
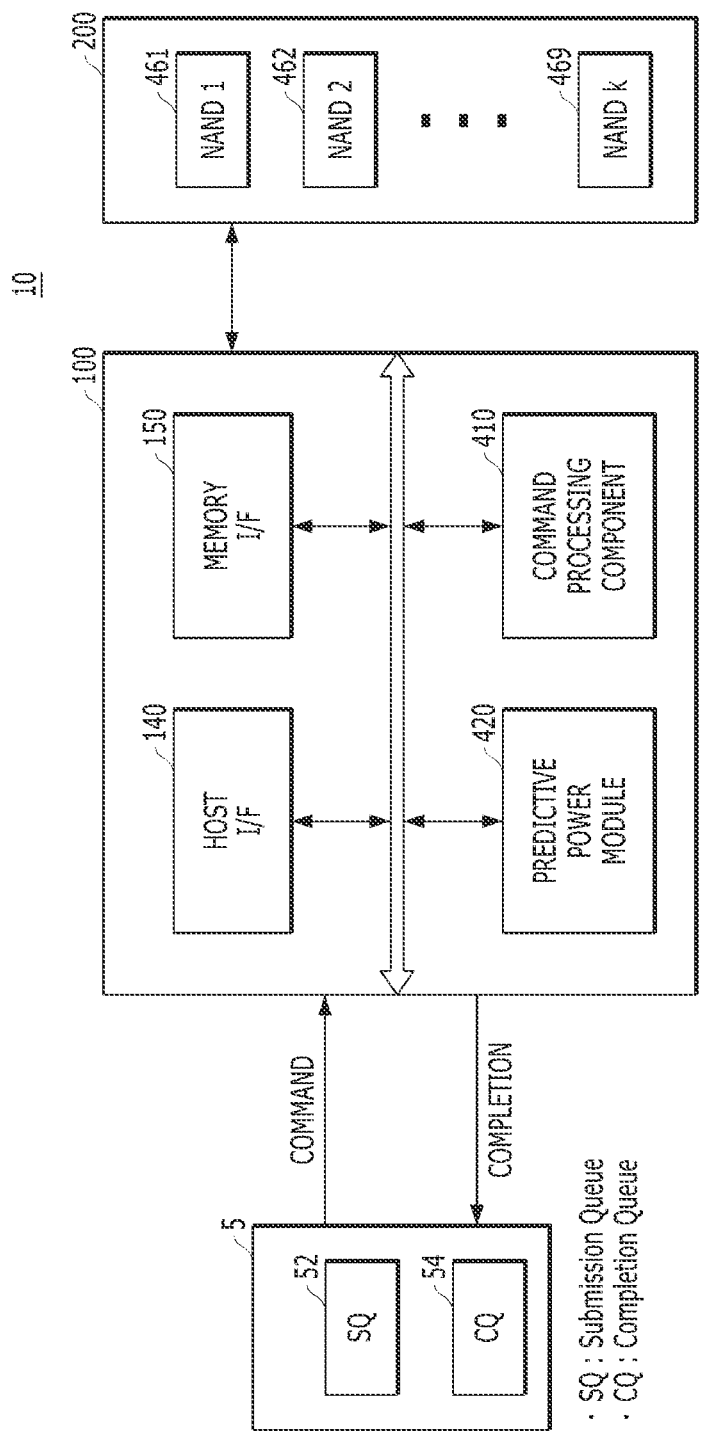
FIG. 1 is a diagram illustrating a data processing system in accordance with one embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

Generally, performance metrics of memory systems (e.g., enterprise SSDs) include throughput in megabyte per second (MB/s) or input and output (IO) operations per second (IOPs), and latency such as average or multi-nines latency profile. Multi-nines latency profile represents the worst command completion time in such nines portion (e.g., 99%, 99.9%), which is commonly referred as quality of service (QoS) measurement.

Memory systems may include memory devices, such as NAND flash memory devices, operably coupled in parallel. Due to the parallelism architecture, command processing completions (e.g., data read or write operations associated with read or write commands) at the memory devices are usually bursty by nature. This means that significantly more commands are completed during a certain time slot than during any other time slots. In this case, performance metrics of memory systems are not consistent. Accordingly, it is desirable to provide a scheme capable of controlling the power consumption.

Indeed, environment, social, and governance (ESG) requirements have pushed more and more on all electronic components to be "greener" technologies. Even for SSDs, a SSD performance per watt is becoming more critical. Accordingly, the integrated energy consumption of a SSD's lifetime is becoming important for many different operating conditions regardless of highly loaded peak performance or not. Typical performance metrics of SSDs are the throughput in MB/s, or the IO operations per second (IOPs). The focus in the past has been on achieving the best performance overall, not necessarily the best performance for a given power consumption constraint.

Most, if not all, existing SSDs do not have the capability to predict the power, performance characteristics much less to predict the power, performance characteristics for different capacities of the same product. For example, 1 TB/2 TB/4 TB/8 TB SSD of the same product model share the same power state and the same power consumption target numbers ignoring their respective capacity characteristics. Also, often non-apparent complicated power throttling logics make the resulting performance unpredictable.

In this context, the present invention in one embodiment provides a computational algorithm which calculates (predicts) the performance per watt under at least the following constraints: various SSD capacities, various power states, and various workloads. The computational algorithm of the present invention may be used real time in a memory controller or may be used ahead of a set of memory operations with predictive criteria being provided to a host for its consideration of the integrated energy consumption when sending commands to the memory device.

FIG. 1 is a diagram illustrating a data processing system in accordance with one embodiment of the present invention.

Referring to FIG. 1, the data processing system may include a host 5, a controller 100 and a memory device 200. The controller 100 and the memory device 200 may configure a memory system 10. For example, the controller 100 and the memory device 200 may include various components of the memory system 10 not shown herein. While the explanation below is focused on NVMe SSD based terminologies, the present invention is not so limited and is applicable to other memory devices including different types SSDs. In NVMe (Non-Volitile Memory Express) SSD, IO command queues are paired as a Submission Queue (SQ) and a Completion Queue (CQ).

In the illustrated embodiment shown in FIG. 1, the memory system 10 may be implemented with a non-volatile memory express (NVMe) SSD and the memory device 200 may be implemented with a plurality of memories in parallel, e.g., k NAND flash memories 461 to 469 in parallel. The NAND flash memories (e.g., NAND dies) 461 to 469 are coupled to the memory controller 100 through one or more channels.

The host 5 may exchange command requests and completions with and the memory system 10 via a predefined IO command queue structure. For example, the host 5 includes a submission queue (SQ) 52 and a completion queue (CQ) 54, which are paired as IO command queues. The host 5 may include SQ and CQ pairs depending on configuration such as the number of CPU cores in the controller 100, operating system (OS) and storage (i.e., memory device) IO configurations. The submission queue 52 may store command requests associated with operations of the memory device 200, which are submitted to the memory controller 100. The completion queue 54 may receive completion notifications of command requests, i.e., items of data indicating that respective command requests have been completed, from the controller 100 and store the received completion notifications. Thus, the host 5 recognizes completion of each of the command requests as the corresponding completion data is put in the completion queue 54. In response to completion data being delivered to the completion queue 54, the host puts new command(s) into the submission queue 52 to maintain a predefined number of commands for processing by the memory system 10.

The controller 100 may include a host interface (I/F) 140, a memory interface (I/F) 150, a command processing component 410 and a predictive power performance module 420. These components 410, 420 may be implemented with internal components (e.g., software (SW)) of the control component 120. Alternatively, these components 410, 420 may be implemented with hardware (HW) components. Although not shown in FIG. 1, the controller 100 and the memory device 200 may include various other components of the memory system 10.

The host interface 140 may receive command requests from the host 5. For example, the command requests may be associated with operations (e.g., read, write or erase operations) on the memory device 200. The command processing component 410 may process the command requests to perform the command requests on the memory device 200.

In one embodiment of the present invention, the inventive control algorithm deterministically controls the active resource allocation to each workload per its target based on static resource allocation table(s), without complicated logics or hardware measurement feedback loops. Workload type identification permits different resource threshold levels due to different power consumptions of the various memory components.

In one embodiment of the present invention, the control (or predictive) algorithm dynamically allocates or de-allocates an active resource in a deterministic way by use of a static hardware resource table(s). Among numerous limiting factors/resources of the throughput/power in SSD, the NAND is the major contributing component to throughput/power. The power consumption is directly proportional to the utilization of the NAND components. Inside a SSD, the NAND is composed of multiple physical packages. Each physical package is composed of multiple dies typically with different operating characteristics. As the SSD capacity grows, the number of dies also grows. The throughput and power are proportional to the number of dies until the performance is saturated due to other factors.

Per the allocation of hardware resources, the resulting (throughput, power) pair will increase or decrease to achieve a budgeted (throughput, power) target for a given power state at a given SSD capacity drive. As a result of the algorithm totalizing each individual power state of the SSD operation such as totalizing the power/throughput for each single read, write, or erase event, different capacities of the solid state drive will have a predictable (throughput, power) trend achieving a desired throughput per watt.

Figure 2:
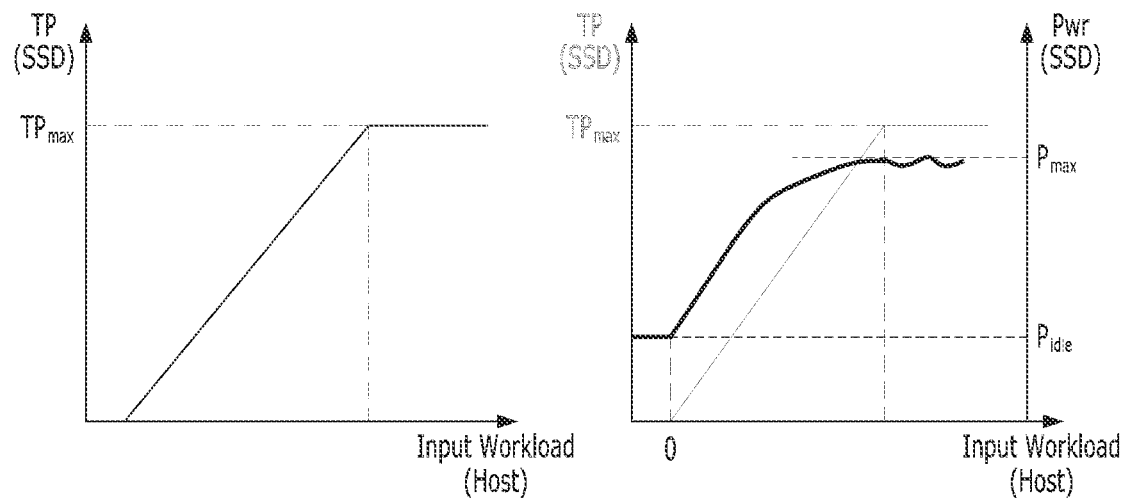
FIG. 2 is a graphical plot of throughout per input workload in accordance with still another embodiment of the present invention.

FIG. 2 is a graphical depiction of throughput/power consumption vs a host input workload.

More specifically, shown in FIG. 2 is a conceptualization of a generic NVMe SSD (throughput, power consumption) vs host input workload. The left-side depiction in FIG. 2 shows that the SSD throughput increases with the host input workload as it increases until the SSD reaches its saturation point, noted there as TPmax. Likewise, the right-side depiction shows that the power consumption reaches its maximum at the same time of the maximum throughput. The maximum throughput is usually determined by resource limitations inside the SSD and the input workload type.

Figure 3:
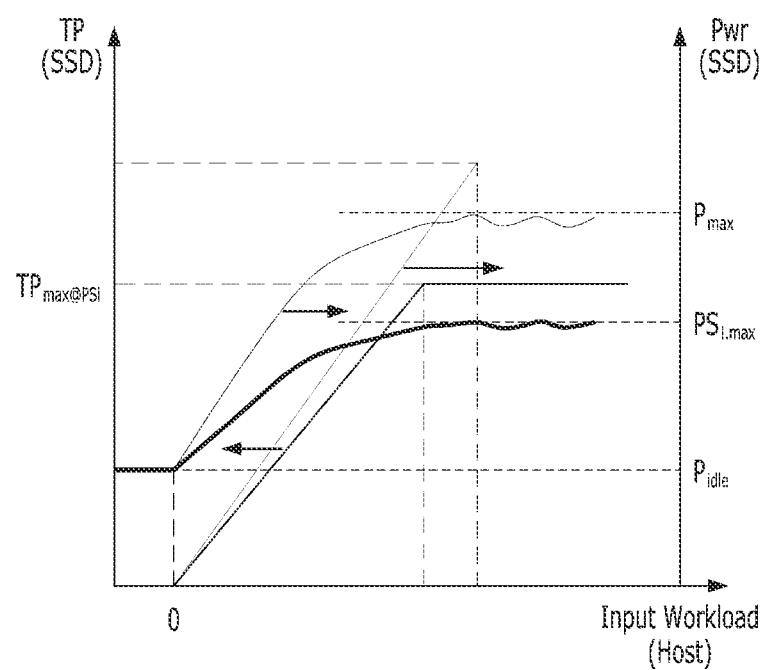
FIG. 3 is a graphical plot of throughout per input workload in accordance with yet another embodiment of the present invention.

Due to the demand for the less power at numerous mission critical operations in different integrated environments, the SSD hosts usually enforces certain power limitations on the SSD during a specific period, which is provided for example by NVMe power state specifications providing the protocols for this information transfer. FIG. 3 is a graphical depiction of host input vs (TP, Pwr) for a specific power state PSi. More specifically, as shown in FIG. 3, the SSD operates at two different maximum power constraints, Pmax (hereinafter referred to as the PS0 state) and PSi, max (hereinafter referred to as the PSi Power State).

When the host enforces the PSi limit on the SSD during any of its operating time segments, the throughput curve will be lower than the corresponding PS0 curve, and the throughput curve may have a different shape than the PS0 curve depending on the algorithm of the SSD under PSi.

Figure 4:
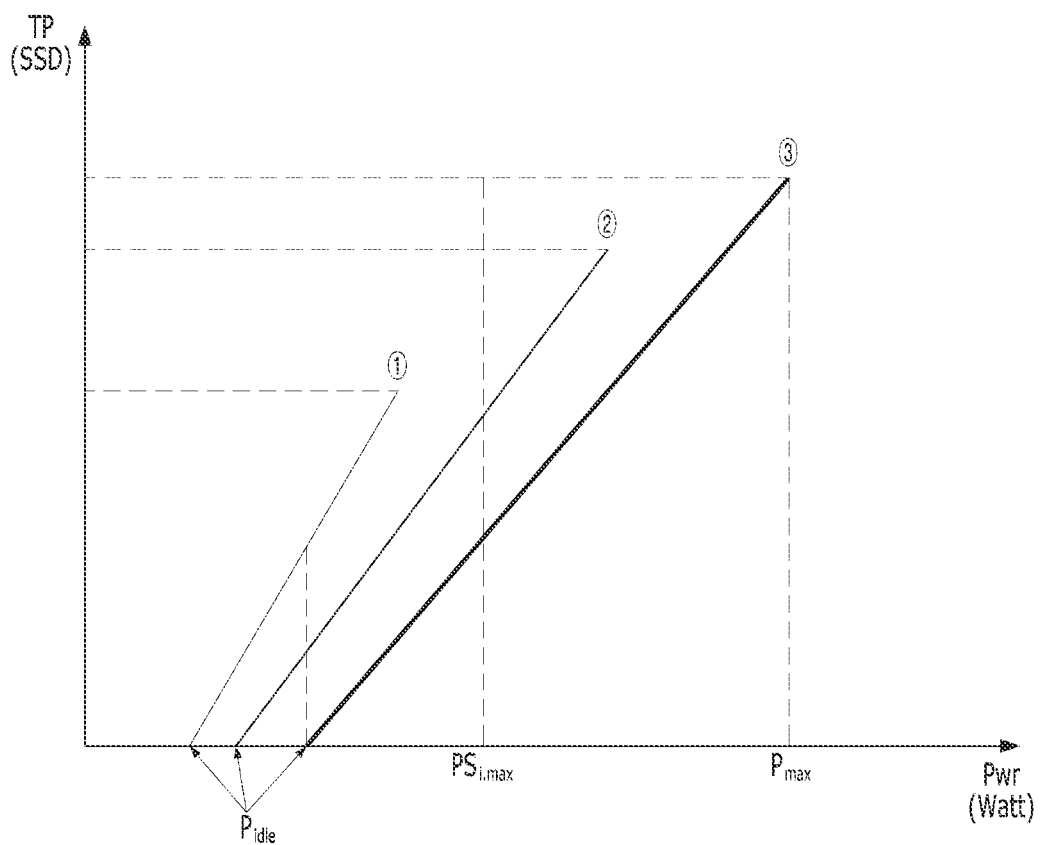
FIG. 4 is graphical plot of throughout per input workload in accordance with one embodiment of the present invention where different storage die in a SSD have different power levels per throughput.
Figure 5:
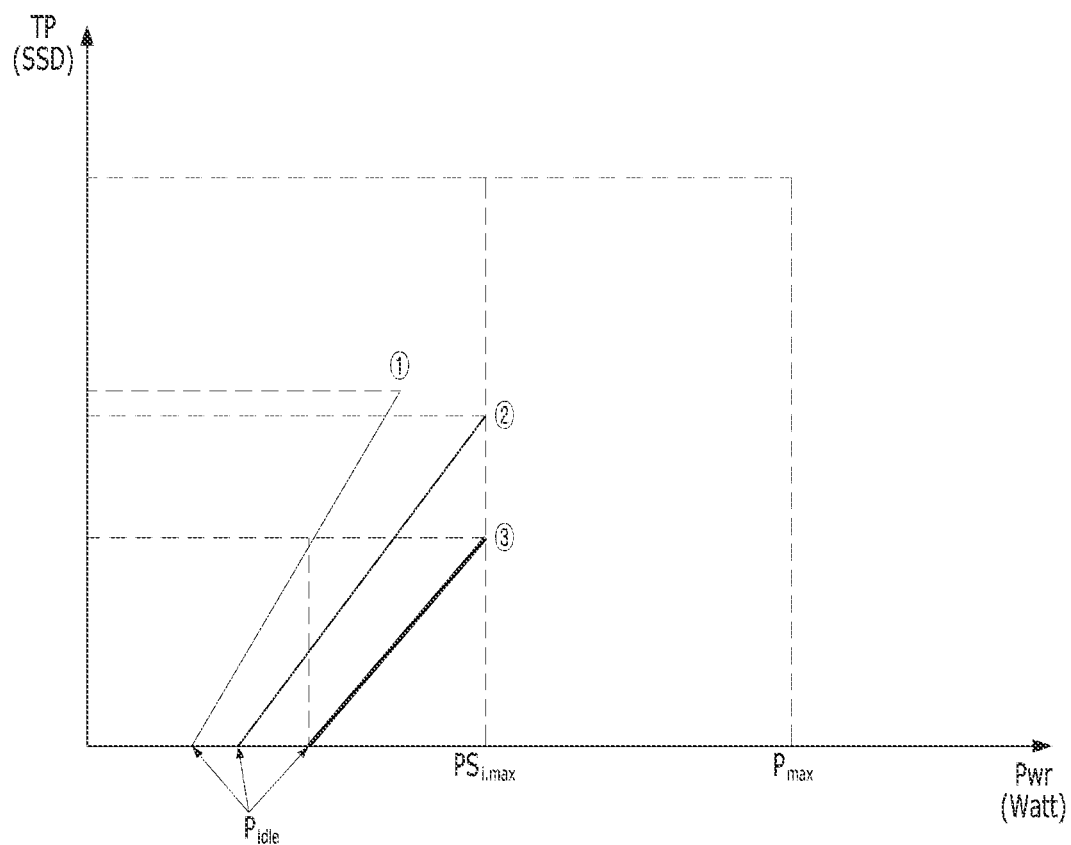
FIG. 5 is graphical plot of throughout per input workload in accordance with yet another embodiment of the present invention.

FIG. 4 is a graphical depiction of (TP, Pwr) at different capacity drives, with no Power State constraint. FIG. 5 is a graphical depiction of (TP, Pwr) at different capacity drives under the PSi constraint.

The SSD's primary component is NAND, and it is the major contributing component to the throughput and the power consumption. One important aspect of the SSD is the capacity of the SSD which defines how much storage space is allocated for a user. The generic characteristics of SSD (for different storage capacities) show the following trends as seen FIGS. 4 and 5. The order of the capacity size is storage size of device 1 is less than storage size of device 2, which is less than storage size of device 3. For the same power consumption, the smaller capacity drive has a higher throughput efficiency (performance per watt) due to less overhead losses in the smaller capacity drive.

Figure 6:
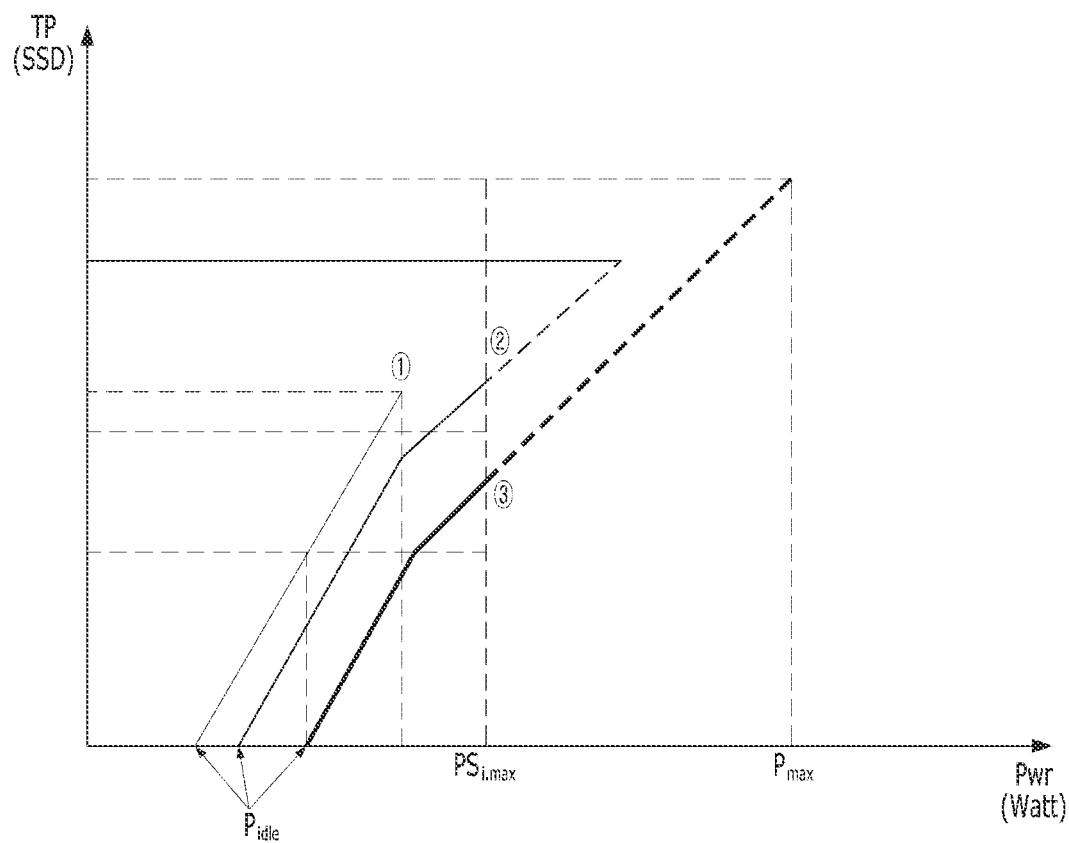
FIG. 6 is graphical plot of throughout per input workload in accordance with still another embodiment of the present invention.

FIG. 6 shows the improved performance per watt in device 2 ② and device 3 ③ under power state PSi controlled by the algorithm of the present invention. At the same performance level, the power consumption difference between the larger storage devices is maintained by the control algorithm to similar to that of an idle power difference for smaller storage devices.

The various workloads under control by the inventive control algorithm for the performance per watt include the sequential write, the sequential read, the random write and the random read. Each workload defines a different set of resource utilization targets. For example, a NAND die consumes 5~10 times more current (or power) during an active operation such as Page Read or Page Program than during an idle time. Depending on the power consumption numbers, the target of the maximum power at each power state and the maximum number of the active resources at each power state is determined for example during the design phase.

Computational Algorithm

Figure 7:
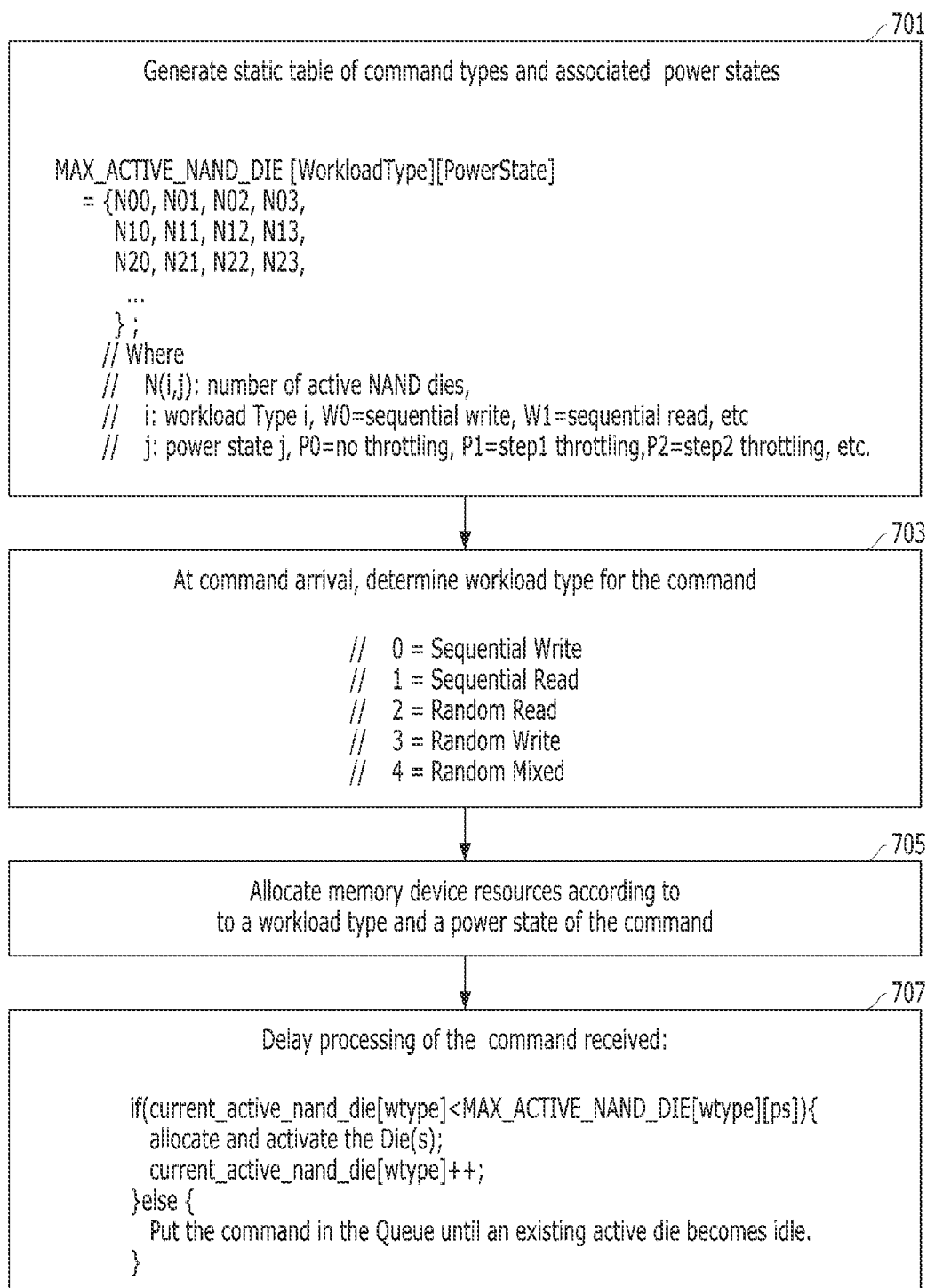
FIG. 7 is a flowchart illustrating a method for controlling a storage device in accordance with yet another embodiment of the present invention.

FIG. 7 is a flow chart depicting a computational algorithm of the present invention for computing power consumption data per operational state of memory device.

Consider a two dimensional NAND resource array, with static initializations per SSD capacity. (Similar allocations can be applied to other contributing resources.) Define an active die as a die in any operation state other than idle, such as program (including erase) and read operation states of its page/block. At 701, in FIG. 7, a static hardware resource table is generated for different threshold numbers for the operation states of the page/block of the memory device. As shown at 701, the code listing for generating the static hardware resource table may be:

```
MAX_ACTIVE_NAND_DIE [WorkloadType][PowerState] =
  { N00, N01, N02, N03,
    N10, N11, N12, N13,
    N20, N21, N22, N23,
    ...
  };
``` where N (i,j) is the number of active NAND dies in the SSD, i is workload type i, W0=sequential write, W1=sequential read; and j is a power state j, like P0=no throttling, P1=step1 throttling, P2=step2 throttling.

Suppose for illustration that the number of the maximum available dies with 512 Gb/die=128@8 TB, 64@4 TB, 32@2 TB, 16@1 TB. For an 8 TB drive, a set of static values can be assigned as N00=128, N01=64, N02=32, N03=16. Then, the drive will show values close to (or a little less than) an un-throttled max throughput of 4 TB/2 TB/1 TB drives at a power state 1/2/3 respectively for workload type 0.

At 703, in FIG. 7, for every new command arrival at the SSD (at any given power state ps of the BAND), a workload type is identified. In other words, at 703, a workload_type command may obtain a power state ps (over a given observation interval width) for a memory device. For example, the workload_type command may be a NVMe command. As shown at 703, the type may be a specific workload type, such as but not limited to the following:

0=Sequential Write
1=Sequential Read
2=Random Read
3=Random Write
4=Random Mixed Operation between Read and Write Once the workload type is identified, at 705, resources of the memory device are allocated according to the workload type and the power state needed for the command received. For example, according to the workload type and the power state of the command received, allocations which do not exceed the maximum power threshold (such as in FIG. 6) are recognized, and likewise the workload type and the power state of the command received which exceeds maximum power threshold are recognized to delay the allocation.

At 707, a command process is shown which can delay the processing of the command received. At 707, if the workload type and the power state of the command received do not exceed maximum power threshold (such as in FIG. 6), the command may be processed in the order received. At 707, if the workload type and the power state of the command received exceeds the maximum power threshold, execution of the received command is delayed until an idle state (for memory cells involved in the command operations) occurs. The following command listing as shown in FIG. 7 may be used:

```
{
   if (current_active_nand_die[wtype] < MAX_ACTIVE_NAND_DIE[wtype][ps] ){
      Allocate and activate the Die(s);
      current_active_nand_die[wtype]++ ;
   }else {
      Put the command in the Queue until an existing active die becomes idle.
   }
}
```

A power state transition between different states Pi and Pj happens by a power budget demand mostly, if not all the time, by direction from the host application. The resulting power state transition will be communicated per the SSD specification, like the NVMe specification.

The method described above can be utilized for operating a memory system including a server and a plurality of SSDs. This method can be applied to NAND flash based SSDs (as described above), and is especially beneficial for memory devices having multiple power states, and is especially beneficial for hardware resources with noticeably different power consumptions between idle and active states (such as for example in SSD NVMe). This method can be especially beneficial for hardware resources with dynamically adjustable target (power, performance) criteria.

Figure 8:
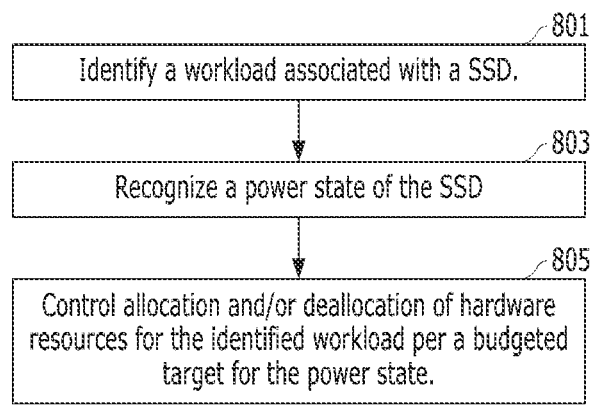
FIG. 8 is a flowchart illustrating a method for operating a data storage system in accordance with one embodiment of the present invention.

FIG. 8 is a flowchart illustrating a method for operating a data storage system including a host and at least one solid state drive (SSD). At 801, the method for operating the data storage system identifies a workload associated with the SSD (e.g., a workload associated with an operational command received from a host). At 803, the method recognizes a power state of the SSD (e.g., based on the identified work load). At 805, the method controls allocation and/or deallocation of hardware resources for an identified workload per a budgeted target for the power state.

In this method for operating a data storage system, a set of static hardware resource tables for each power state of the SSD per a plurality of operational commands can be generated. A power state may be recognized by identifying from the set of static hardware resource tables a power state associated with the operational command received from the host.

In this method for operating a data storage system, when die needed for the operational command exceeds a maximum active die limit for the SSD, queue the operational command for execution until active die become idle. Meanwhile, when the die needed for the operational command is less than the maximum active die limit for the SSD, allocate resources for the operational command and execute the operational command.

In this method for operating a data storage system, a maximum power consumption (e.g., a maximum power consumption value) for the operational command received from the host can be provided to the host, and the maximum power consumption for the operational command received from the host may be predicted based on the workload of the operational command and the power state of the SSD In this method, a maximum hardware allocation for the SSD can be predicted based on the identified workload of the operational command and the recognized power state for the SSD.

In this method for operating a data storage system, hardware resources can be allocated among different memory devices in the SSD having multiple power states, with the multiple power states having different power consumptions between an idle power state and an active power state including at least one of read state, a program state, and an erase state.

Accordingly, in one embodiment of the present invention, there is provided a system for operating a data processing system, comprising: a host; a memory storage; and a controller included in the memory storage, the controller configured to: identify a workload associated with the SSD; recognize a power state of the SSD for an operational command received from the host; and control allocation and/or deallocation of hardware resources for the identified workload per a budgeted target for the recognized power state.

The controller in this system may be configured to generate a set of static hardware resource tables for each power state of the SSD per a plurality of operational commands. The controller may be configured to identify from the set of static hardware resource tables the power state associated with the operational command received from the host.

The controller in this system may be configured, when die needed for the operational command exceeds a maximum active die limit for the SSD, to queue the operational command for execution until active die become idle. The controller may be configured, when the die needed for the operational command is less than the maximum active die limit for the SSD, to allocate resources for the operational command and execute the operational command.

In this system, the host is provided a maximum power consumption for the SSD based on the operational command received from the host. The controller may be configured to predict the maximum power consumption for the operational command received from the host based on the workload of the operational command and the power state of the SSD. The controller may be configured to predict a maximum hardware allocation for the SSD based on the workload of the operational command and the power state of the SSD. The controller may be configured to allocate hardware resources among different memory devices in the SSD having multiple power states.

In this system, there can be multiple power states having different power consumptions between the idle or non-operational power state and the default power state PSO with no or minimum power throttling.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives recognized by one skilled in the art.

What is claimed is:

1. A method for operating a system including a host and at least one solid state drive (SSD), the method comprising:
   identifying a workload-type associated with an operational command received from the host by the at least one SSD, wherein the workload-type identifies an order of read/write operations for the operational command received from the host;
   recognizing a power state of the at least one SSD needed for the workload-type identifying the order of the read/write operations associated with the operational command received from the host; and
   controlling allocation and/or deallocation of hardware resources based on the identified order of the read/write operations for the operational command received from the host per a budgeted target for the recognized power state needed for memory cells involved in the identified order of the read/write operations for the operational command received,
   wherein
   for the recognized power state needed for the memory cells involved in the identified order of the read/write operations which does not exceed a maximum power threshold, the allocation of the hardware resources is recognized and the read/write operations are processed in the identified order, and
   for the recognized power state needed for the memory cells involved in the identified order of the read/write operations which exceeds the maximum power threshold, the allocation of the hardware resources and the read/write operations are delayed.

2. The method of claim 1, wherein the identifying a workload-type comprises generating a set of static hardware resource tables for power states of the at least one SSD per a plurality of operational commands.

3. The method of claim 2, wherein the recognizing a power state comprises:
   identifying from the set of static hardware resource tables the power state of the at least one SSD for the operational command received from the host.

4. The method of claim 3, wherein the controlling allocation comprises:
   when die needed for the operational command exceeds a maximum active die limit for the at least one SSD, queue the operational command for resource allocation until any active die become idle.

5. The method of claim 4, wherein the controlling allocation comprises:
   when the die needed for the operational command is less than the maximum active die limit for the at least one SSD, allocate resources for the operational command and execute the operational command.

6. The method of claim 1, further comprising providing to the host a maximum power consumption for the at least one SSD based on the operational command received from the host.

7. The method of claim 6, further comprising predicting the maximum power consumption for the operational command received from the host based on the workload-type associated with the operational command received from the host and the power state of the at least one SSD needed for the operational command received.

8. The method of claim 6, further comprising predicting a maximum hardware allocation for the at least one SSD based on the workload-type associated with the at least one SSD of the operational command and the power state of the at least one SSD needed for the operational command received.

9. The method of claim 3, further comprising allocating hardware resources among different memory devices in the at least one SSD having multiple power states.

10. The method of claim 9, wherein the multiple power states have different power consumptions between an idle or non-operational power state and a default power state with minimum power throttling.

11. A system for operating a data processing system, comprising:
    a host;
    a memory storage; and
    a controller included in the memory storage, the controller configured to:
    identify a workload-type associated with an operational command received from the host by a solid state drive (SSD), wherein the workload-type identifies an order of read/write operations for the operational command received from the host;
    recognize a power state of the SSD needed for the workload-type identifying the order of the read/write operations associated with the operational command received from the host; and
    control allocation and/or deallocation of hardware resources based on the identified order of the read/write operations for the operational command received from the host per a budgeted target for the recognized power state needed for memory cells involved in the identified order of the read/write operations for the operational command received,
    wherein
    for the recognized power state needed for the memory cells involved in the identified order of the read/write operations which does not exceed a maximum power threshold, the allocation of the hardware resources is recognized and the read/write operations are processed in the identified order, and
    for the recognized power state needed for the memory cells involved in the identified order of the read/write operations which exceeds the maximum power threshold, the allocation of the hardware resources and the read/write operations are delayed.

12. The system of claim 11, wherein the controller is configured to generate a set of static hardware resource tables for the power state of the SSD per a plurality of operational commands.

13. The system of claim 12, wherein the controller is configured to identify from the set of static hardware resource tables the power state of the SSD for the operational command received from the host.

14. The system of claim 13, wherein the controller is configured to:
    when die needed for the operational command exceeds a maximum active die limit for the SSD, queue the operational command for resource allocation until any active die become idle.

15. The system of claim 14, wherein the controller is configured to:
    when the die needed for the operational command is less than the maximum active die limit for the SSD, allocate resources for the operational command and execute the operational command.

16. The system of claim 11, wherein the host is provided a maximum power consumption for the SSD based on the operational command received from the host.

17. The system of claim 16, wherein the controller is configured to predict the maximum power consumption for the operational command received from the host based on the workload-type associated with the SSD of the operational command and the power state of the SSD needed for the operational command received.

18. The system of claim 16, wherein the controller is configured to predict a maximum hardware allocation for the SSD based on the workload-type associated with the SSD of the operational command and the power state of the SSD needed for the operational command received.

19. The system of claim 13, wherein the controller is configured to allocate hardware resources among different memory devices in the SSD having multiple power states.

20. The system of claim 19, wherein the multiple power states have different power consumptions between an idle or non-operational power state and a default power state with minimum throttling.

* * * * *